(12) United States Patent
Goitsuka

(10) Patent No.: US 11,251,492 B2
(45) Date of Patent: Feb. 15, 2022

(54) VEHICLE

(71) Applicant: TOYOTA JIDOSHA KABUSHIKI KAISHA, Toyota (JP)

(72) Inventor: Shinya Goitsuka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 16/924,797

(22) Filed: Jul. 9, 2020

(65) Prior Publication Data

US 2021/0013470 A1 Jan. 14, 2021

(30) Foreign Application Priority Data

Jul. 11, 2019 (JP) .............................. JP2019-129212

(51) Int. Cl.
*B60K 1/04* (2019.01)
*H01M 50/20* (2021.01)
*B60R 16/033* (2006.01)
*B62D 27/02* (2006.01)
*B62D 25/20* (2006.01)

(52) U.S. Cl.
CPC .............. *H01M 50/20* (2021.01); *B60K 1/04* (2013.01); *B60R 16/033* (2013.01); *B62D 25/2009* (2013.01); *B62D 27/02* (2013.01); *B60K 2001/0438* (2013.01); *H01M 2220/20* (2013.01)

(58) Field of Classification Search
CPC .. B60R 16/033; B62D 27/02; B62D 25/2009; B60K 1/04; H01M 50/20
See application file for complete search history.

(56) References Cited

U.S. PATENT DOCUMENTS

| | | | | |
|---|---|---|---|---|
| 8,980,458 B2* | 3/2015 | Honjo | ................... | H01M 50/20 |
| | | | | 429/100 |
| 9,540,055 B2* | 1/2017 | Berger | ................. | B62D 35/007 |
| 9,884,544 B2* | 2/2018 | Berger | ................... | B62D 25/20 |
| 10,065,490 B2* | 9/2018 | Haijima | ................ | H01M 50/20 |
| 10,131,247 B2* | 11/2018 | Berger | ...................... | B60K 1/04 |
| 10,549,619 B2* | 2/2020 | Nakayama | ............ | H01M 50/10 |
| 2009/0186266 A1* | 7/2009 | Nishino | ................ | H01M 50/20 |
| | | | | 429/120 |
| 2010/0190044 A1* | 7/2010 | Nishino | ................... | B60K 1/04 |
| | | | | 429/120 |

FOREIGN PATENT DOCUMENTS

JP    2013-012480 A    1/2013

* cited by examiner

*Primary Examiner* — John D Walters
*Assistant Examiner* — James J Triggs
(74) *Attorney, Agent, or Firm* — Sughrue Mion, PLLC

(57) ABSTRACT

A vehicle includes a vehicle body, a power storage device, and a joining unit. The power storage device includes a power storage module and a power storage case. The power storage case includes a case body and a plurality of bottom surface reinforcing members. The joining unit includes a first bracket joined to a first end of a first bottom surface reinforcing member, a second bracket joined to a second end of a second bottom surface reinforcing member, and a third bracket joined to a second end of a third bottom surface reinforcing member. No joining unit is provided at a second end of the first bottom surface reinforcing member.

8 Claims, 13 Drawing Sheets

VEHICLE

This non-provisional application is based on Japanese Patent Application 2019-129212 filed on Jul. 11, 2019 with the Japan Patent Office, the entire contents of which are hereby incorporated by reference.

BACKGROUND

Field

The present disclosure relates to a vehicle.

Description of the Background Art

In recent years, it is quite often that a large-sized power storage device is mounted on a vehicle so as to increase the EV traveling distance. If the large-sized power storage device is disposed inside a vehicle compartment, the space in the vehicle compartment becomes narrow. Therefore, it is considered to dispose the power storage device outside the vehicle compartment.

For example, the battery described in Japanese Patent Laying-Open No. 2013-12480 is disposed on a bottom surface of the vehicle.

The battery includes a battery module and a battery case that houses the battery module inside. The battery case includes a tray member, a cover member provided to cover the tray member, a plurality of beam members, and a plurality of joining members.

The plurality of beam members are fixed on the bottom surface of the tray member, and each beam member is formed to have a longer size in the width direction of the tray member. Both ends of each beam member project in the horizontal direction from the bottom surface of the tray member, and the joining member joins and fixes the ends of each beam member to a side member of the vehicle.

SUMMARY

In the battery having the configuration as mentioned above, for example, when a collision object comes into collision with the battery case from one side surface of the battery, an impact force is applied to one side surface of the battery case and one end of the beam member. The beam member is displaced in the width direction of the vehicle by the impact force applied thereto. Since the beam member is fixed on the bottom surface of the battery case, the battery case deforms in accordance with the displacement of the beam member. Specifically, the one side surface of the battery case deforms by recessing inward, and the other side surface of the battery case deforms by bulging outward.

The other side surface of the battery case is provided with an joining member which joins the other end of the beam member to the side member, and when the impact force is applied to the beam member, since the joining member is fixed to the side member, it is hard for the joining member to move. Thus, as the other side surface of the battery case deforms by bulging outward, the other side surface of the battery case may deform so as to interfere with the joining member, which may crush the battery case.

As mentioned above, the one side surface of the battery case deforms by recessing greatly, while the other side surface of the battery case is prevented from deforming by the joining member provided on the other side surface of the battery case. Therefore, the internal volume of the battery case is reduced, and the battery module housed in the battery case may interfere with the inner wall of the battery case, which may damage the battery module.

The present disclosure has been made in view of the aforementioned problems, and an object thereof is to provide a vehicle which is provided with a power storage device at a lower portion of a vehicle body, and which is capable of preventing a power storage module housed in a power storage case from being damaged even if an impact force is applied to the power storage device from the outside.

The vehicle according to the present disclosure includes a vehicle body, a power storage device provided at a lower portion of the vehicle body, and a joining unit that joins the power storage device to the vehicle body. The power storage device includes a power storage module, and a power storage case. The power storage case is provided with a first side surface located at one side of a first direction which is one of a width direction or a front-back direction of the vehicle and a second side surface located at the other side facing the first side surface, and the power storage module is housed in the power storage case.

The power storage case includes a case body that houses the power storage module, and a plurality of bottom surface reinforcing members provided on a bottom surface of the case body. Each of the plurality of bottom surface reinforcing members has a first end located on the side of the first side surface and a second end located on the side of the second side surface. The joining unit is disposed only at one of the first end and the second end. The plurality of bottom surface reinforcing members includes a first bottom surface reinforcing member, a second bottom surface reinforcing member arranged with an interval from the first bottom surface reinforcing member in a second direction which is the other one of the width direction or the front-back direction of the vehicle, and a third bottom surface reinforcing member arranged at the other side of the first bottom surface reinforcing member relative to the second bottom surface reinforcing member. The joining unit includes a first bracket which is provided on the first side surface and joined to the first bottom surface reinforcing member, a second bracket which is provided on the second side surface and joined to the second bottom surface reinforcing member, and a third bracket which is provided on the second side surface and joined to the third bottom surface reinforcing member.

In the vehicle mentioned above, a collision object may approach from the side of the first side surface toward the power storage device and come into collision with the first bracket. When the collision object comes into collision with the first bracket, an impact force is applied to the case body through the intermediary of the first bracket and the first bottom surface reinforcing member.

Specifically, the impact force is applied in a direction from the first side surface side to the second side surface side. Thus, a portion of the first side surface located around the first bracket deforms by recessing inward, while the second side surface deforms by bulging outward.

Since no bracket is provided at the second end of the first bottom surface reinforcing member, when the second side surface deforms by bulging outward, the second side surface will not interfere with the first bottom surface reinforcing member, and thus, the second side surface is allowed to deform by bulging outward. As a result, the internal volume in the case body is prevented from being reduced, and thereby, the power storage module housed in the power storage case is prevented from interfering with the inner wall or the like of the power storage case.

Further, since the second bracket and the third bracket are provided on the second side surface, the impact force applied to the case body is partially transmitted to the vehicle body through the intermediary of the second bracket and the third bracket, which thereby prevents the amount of deformation of the case body from becoming greater. Furthermore, since the portion of the second side surface that deforms by bulging outward is located between the second bracket and the third bracket, the second side surface is prevented from deforming excessively so as to damage the second side surface.

The first end of the first bottom surface reinforcing member is formed to protrude in the first direction further than the first side surface.

According to the vehicle mentioned above, when a collision object approaches in the first direction, before the collision object comes into collision with the case body, it firstly bumps against the first end, and thus, the collision object is prevented from coming into direct collision with the case body.

The first bracket is disposed outside the first end in the first direction.

According to the vehicle mentioned above, before a collision object comes into collision with the first bottom surface reinforcing member, it firstly bumps against the first bracket, which deforms the first bracket. Thus, at least a part of the kinetic energy of the collision object is absorbed by the deformation of the first bracket, which reduces the impact force applied to the first bottom surface reinforcing member from the collision object. Thereby, the impact force applied from the first bottom surface reinforcing member to the power storage case is reduced, which reduces the deformation of the power storage case.

The first bottom surface reinforcing member is formed to extend in the first direction. Assume that a collision object comes into collision with the vehicle in the first direction, and applies an impact force to the first bottom surface reinforcing member. At this time, the impact force is applied to the first bottom surface reinforcing member in the direction where the first bottom surface reinforcing member extends, in other words, an axial load is applied to the first bottom surface reinforcing member. Therefore, the deformation of the first bottom surface reinforcing member is reduced.

The rigidity of a material forming the first bracket is lower than the rigidity of a material forming the first bottom surface reinforcing member.

According to the vehicle mentioned above, before the collision object comes into collision with the first bottom surface reinforcing member, the first bracket is deformed by the collision object. Since the rigidity of the material forming the first bracket is lower, the first bracket may be deformed by a relatively small external force.

Thus, the impact force transmitted to the power storage case through the intermediary of the first bracket and the first bottom surface reinforcing member may be reduced relatively smaller. By reducing the impact force applied to the power storage case, the inertial force to be applied to the power storage module housed in the power storage case may also be reduced. Since the first bracket is deformed so as to reduce the inertial force to be applied to the power storage module, the power storage module is prevented from being displaced in the power storage case, and thereby, the power storage module is prevented from interfering with the inner wall or the like of the power storage case.

The first bracket includes an uprising portion formed to extend upward from a portion joined to the power storage case. According to the vehicle, when a collision object comes into collision with the vehicle from a side surface thereof and bumps against the first bracket, the collision object firstly bumps against the uprising portion. Since the uprising portion is formed to extend upward, the uprising portion is easily deformed by an external force from the collision object. Thus, the first bracket is deformed so as to reduce the impact force to be applied to the power storage case, and thereby, the power storage module is prevented from interfering with the inner wall of the power storage case.

The power storage device further includes a side surface reinforcing member provided on at least one of the first side surface and the second side surface, and the side surface reinforcing member is joined to the first bottom surface reinforcing member and the second bottom surface reinforcing member.

According to the vehicle mentioned above, even if an impact force is applied from the collision object to the first bottom surface reinforcing member, the side surface reinforcing member may prevent the first bottom surface reinforcing member from being displaced relative to the second bottom surface reinforcing member by the impact force. Since the first bottom surface reinforcing member is fixed on the bottom surface of the power storage case, if the first bottom surface reinforcing member is prevented from being displaced, the deformation of the power storage case may be reduced.

The first direction is the width direction of the vehicle, the joining unit includes a fourth bracket disposed in a front portion of the vehicle on the side of the first side surface and arranged in front of the first bracket, and the width of the fourth bracket in the width direction of the vehicle is wider than the width of the first bracket in the front-back direction of the vehicle.

According to the vehicle mentioned above, the rigidity of the fourth bracket when an external force is applied from the vehicle front-back direction is higher than the rigidity of the first bracket when the external force is applied from the vehicle width direction. Since the fourth bracket is joined to the distal end of the power storage case, the deformation of the power storage case may be reduced even when an external force is applied to the distal end of the power storage case.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
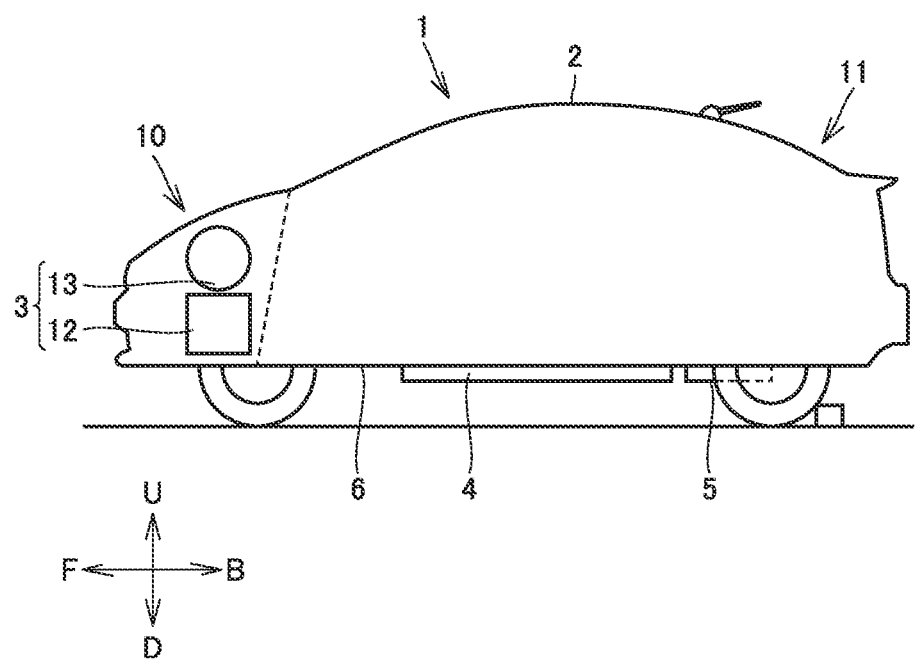
FIG. 1 is a side view schematically illustrating a vehicle 1 on which a power storage device according to an embodiment is mounted.

A power storage device according to an embodiment of the present disclosure will be described with reference to FIGS. 1 to 17. In the configurations illustrated in FIGS. 1 to 17, the same or substantially the same members are denoted by the same reference numerals, and the description thereof will not be repeated. In the configurations described in the embodiments, a member corresponding to a member described in the claims may be accompanied by the member of the claims in parentheses.

First Embodiment

FIG. 1 is a side view schematically illustrating a vehicle 1 on which the power storage device according to a first embodiment is mounted. The vehicle 1 includes a vehicle body 2, a drive device 3, a power storage device 4, and a fuel tank 5. The vehicle body 2 includes a bottom member 6 that forms a lower portion of the vehicle body 2. The vehicle body 2 is formed with an engine compartment 10 and a passenger compartment 11.

The drive device 3 is housed in the engine compartment 10. The drive device 3 includes an engine 12 and an electric motor 13. The passenger compartment 11 is a space for loading a passenger such as a driver or the like. The power storage device 4 and the fuel tank 5 are provided on a lower surface of the bottom member 6.

Figure 2:
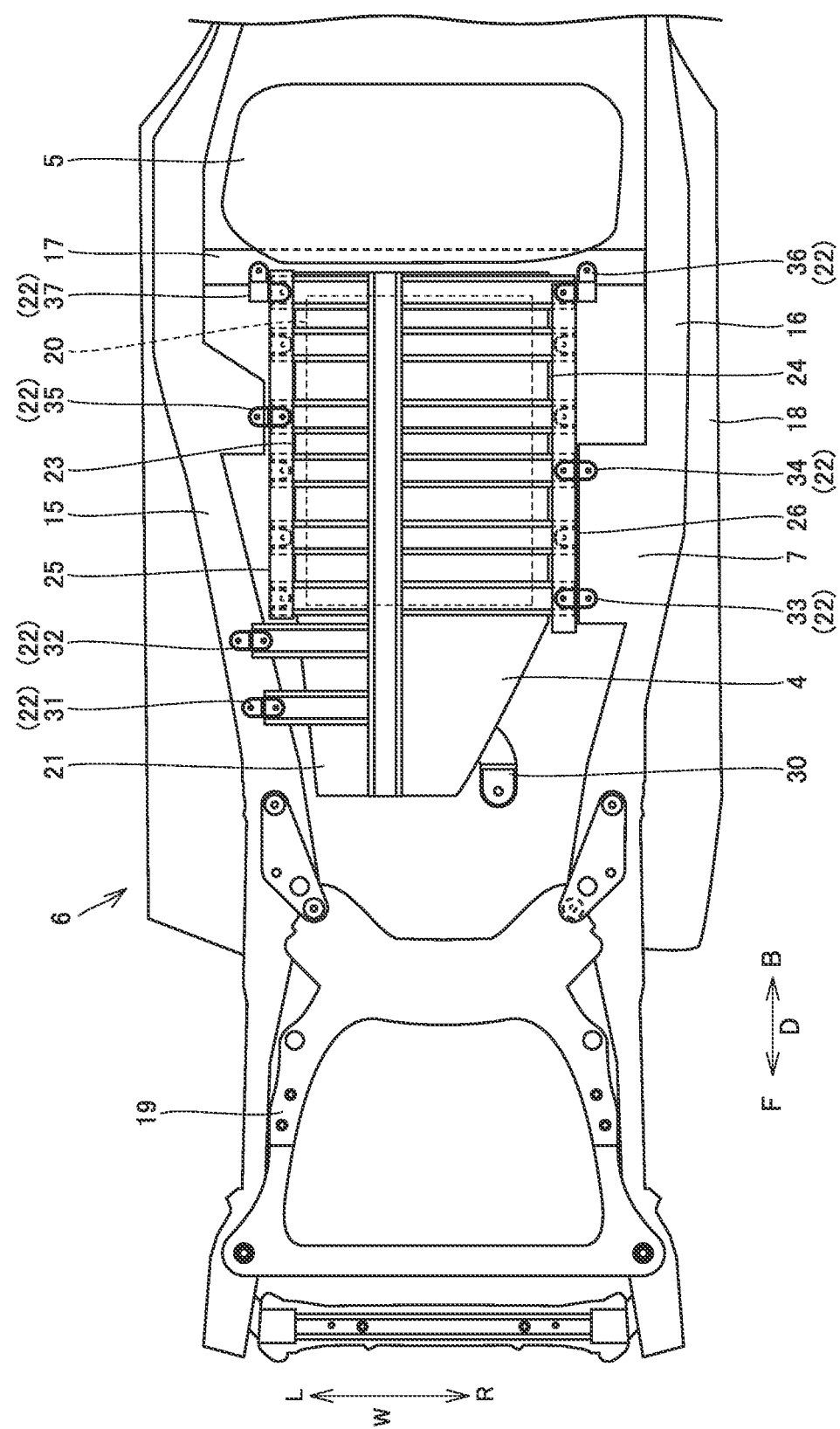
FIG. 2 is a bottom view illustrating a bottom surface of the vehicle 1.

FIG. 2 is a bottom view illustrating a bottom surface of the vehicle 1. The bottom member 6 includes a side member 15, a side member 16, a cross member 17, a floor panel 18, and a front frame 19.

The side member 15 and the side member 16 are arranged with an interval between each other in a width direction W of the vehicle 1. Each of the side members 15 and 16 is formed to have a longer size in a front-back direction D of the vehicle 1.

The side member 16 is formed with a mount 7, and the mount 7 is formed to project from the side member 16 toward the center of the vehicle 1 in the width direction W.

The cross member 17 is formed to connect the side member 15 and the side member 16. The cross member 17 is formed to have a longer size in the width direction W.

The floor panel 18 is a plate-shaped metal member and is arranged on the upper surface of the side members 15, 16 and the cross member 17. The floor panel 18 forms the bottom surface of the passenger compartment 11.

The front frame 19 is arranged in front of the side members 15 and 16, and is joined to the side members 15 and 16. The front frame 19 is arranged below the engine compartment 10. The front frame 19 supports the drive device 3.

The power storage device 4 and the fuel tank 5 are fixed to the lower surface of the floor panel 18. In the first embodiment, the vehicle 1 includes a power storage device 4, a joining unit 22, and side surface reinforcing members 25 and 26. The power storage device 4 includes a power storage module 20 and a power storage case 21.

The power storage module 20 includes a plurality of power storage cells, and each power storage cell is, for example, a secondary battery such as a lithium ion battery. The power storage case 21 houses the power storage module 20 therein. The power storage case 21 includes a side surface 23 and a side surface 24, both of which extend in the front-back direction D of the vehicle 1. The side surface 24 is located at one side in the width direction W, and the side surface 23 is located at the other side facing the side surface 24. Specifically, the side surface 23 is the left side surface of the power storage case 21, and the side surface 24 is the right side surface of the power storage case 21.

The side surface reinforcing member 25 is formed to extend with a longer size along the side surface 23, and the side surface reinforcing member 26 is formed to extend with a longer size along the side surface 24.

The joining unit 22 is a member for fixing the power storage case 21 to the bottom member 6. The joining unit 22 includes a plurality of brackets 30, 31, 32, 33, 34, 35, 36 and 37. The brackets 30, 31, 32, 33, 34, 35, 36 and 37 are made of, for example, a metal material having a tensile strength of about 440 MPa.

The brackets 31, 32, 35 and 37 are provided on the side surface 23 of the power storage case 21 with an interval between each other in the front-back direction D, and the brackets 30, 33, 34 and 36 are disposed provided on the side surface 24 with an interval between each other in the front-back direction D.

The plurality of brackets 30 to 36 are sequentially arranged from the front end to the rear end of the power storage device 4 in the order of the brackets 30, 31, 32, 33, 34, 35 and 36. The bracket 37 is arranged at a position facing the bracket 36 in the width direction W.

The bracket 30 joins and fixes the power storage case 21 to the floor panel 18. The brackets 33 and 34 join and fix the power storage case 21 to the mount 7. The bracket 36 joins and fixes the power storage case 21 to the cross member 17. The brackets 31, 32 and 35 join and fix the power storage case 21 to the side member 15. The bracket 37 joins and fixes the power storage case 21 to the cross member 17.

In the first embodiment, the bracket (first bracket) 33 and the bracket (first bracket) 34 are arranged between the bracket (second bracket) 32 and the bracket (third bracket)

35 in the front-back direction D. In other words, no bracket is provided on a portion of the side surface 23 to face the brackets 33 and 34 in the width direction W.

Figure 3:
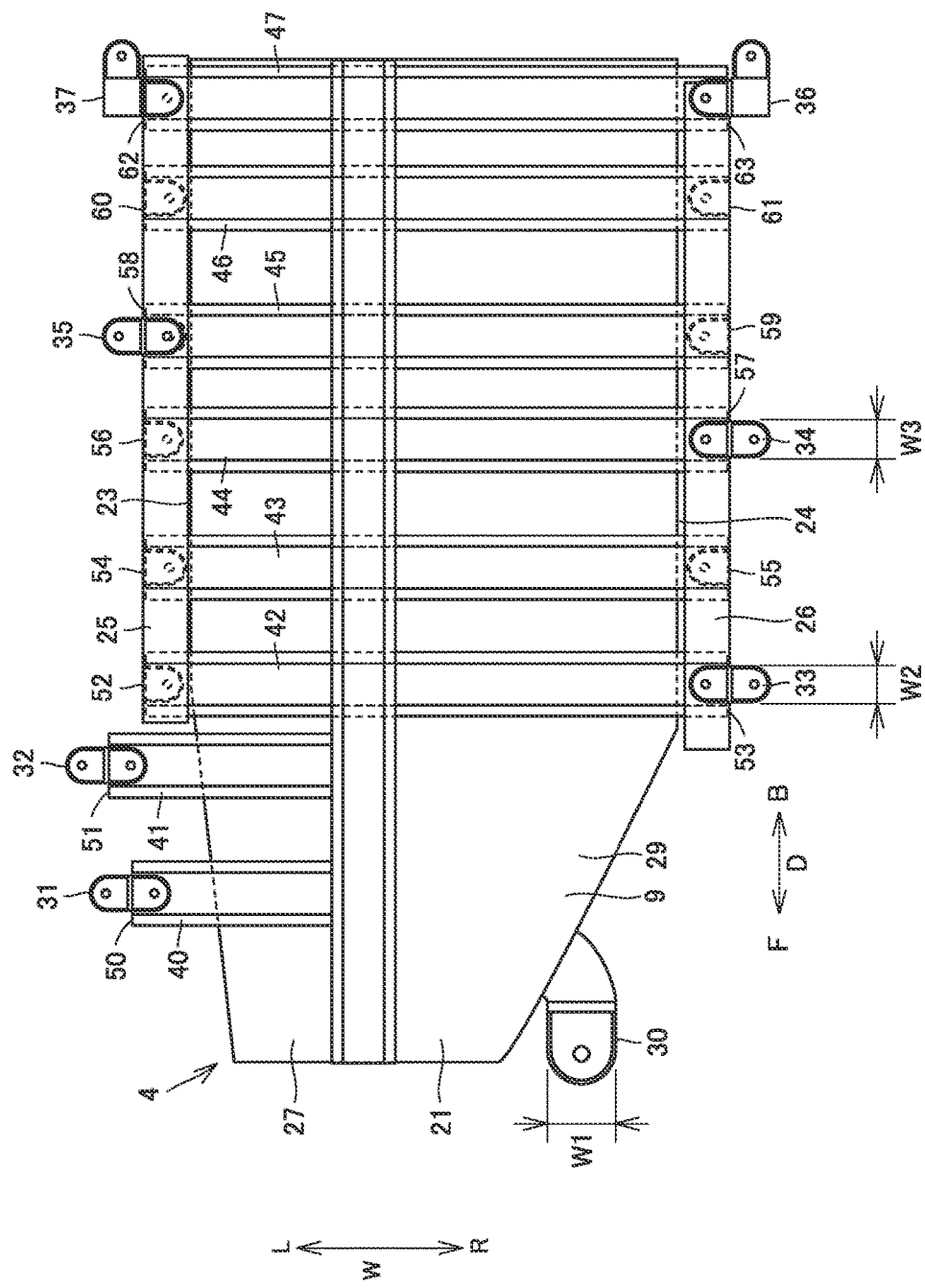
FIG. 3 is a bottom view illustrating a bottom surface of a power storage device 4.

FIG. 3 is a bottom view illustrating the bottom surface of the power storage device 4. The power storage case 21 includes a case body 9 and a plurality of bottom surface reinforcing members 40, 41, 42, 43, 44, 45, 46 and 47 which are provided on a bottom surface 29 of the case body 9. The bottom surface reinforcing members 40, 41, 42, 43, 44, 45, 46 and 47 are made of, for example, a metal material having a tensile strength of about 1180 MPa. Therefore, the bottom surface reinforcing members 40, 41, 42, 43, 44, 45, 46 and 47 are made of a material that is less deformable than the material of the brackets 30, 31, 32, 33, 34, 35, 36 and 37.

The plurality of bottom surface reinforcing members 40 to 47 are sequentially arranged from the front end to the rear end of the power storage case 21 in the order of the bottom surface reinforcing members 40, 41, 42, 43, 44, 45, 46 and 47. Each of the bottom surface reinforcing member 40, 41, 42, 43, 44, 45, 46 and 47 is fixed to the bottom surface 29 of the power storage case 21 by fixing members such as bolts separated with an interval between each other in the width direction W.

The bottom surface reinforcing members 40 and 41 are formed to extend from a central part of the bottom surface 29 of the power storage case 21 in the width direction W toward the side surface 23. The bottom surface reinforcing member 40 include an end 50 located on the side of the side surface 23, and the bottom surface reinforcing member 41 include an end 51 located on the side of the side surface 23. The bottom surface reinforcing members 40 and 41 are formed to protrude further than the side surface 23 in the width direction W of the vehicle 1, and the ends 50 and 51 protrude further than the side surface 23 in the width direction W of the vehicle 1. The bracket 31 is joined to the end 50, and the bracket 32 is joined to the end 51.

The bottom surface reinforcing members 42, 43, 44, 45, 46 and 47 are formed so as to extend in the width direction W. Each end 52, 54, 56, 58, 60 and 62 of the bottom surface reinforcing members 42, 43, 44, 45, 46 and 47 on the side of the side surface 23 protrudes further than the side surface 23 in the width direction W.

Each end 53, 55, 57, 59, 61 and 63 of the bottom surface reinforcing members 42, 43, 44, 45, 46 and 47 on the side of the side surface 24 protrudes further than the side surface 24 in the width direction W.

The brackets (first bracket) 33 and 34 on the side of the side surface (first side surface) 24 joins respectively the ends 53 and 57 of the bottom surface reinforcing members 42 and 44 to the side member 16 of the bottom member 6. The bracket 35 joins the end 58 of the bottom surface reinforcing member 45 to the side member 15 of the bottom member 6.

Similarly, the bracket 36 joins and fixes the end 63 to the cross member 17, and the bracket 37 joins and fixes the end 62 to the cross member 17.

Thus, in the vehicle 1 according to the first embodiment, the power storage device 4 includes a plurality of bottom surface reinforcing members 42, 45 and 41 which are provided with an interval in the front-back direction (second direction) D of the vehicle 1. The bottom surface reinforcing member (second bottom surface reinforcing member) 45 is disposed with an interval in the front-back direction D from the bottom surface reinforcing member (first bottom surface reinforcing member) 42, and the bottom surface reinforcing member (third bottom surface reinforcing member) 41 is disposed at the other side of the bottom surface reinforcing member 42 relative to the bottom surface reinforcing member (second bottom surface reinforcing member) 45. The bracket (first bracket) 33 is joined to the end (first end) 53 of the bottom surface reinforcing member 42. Similarly, the bracket 35 is joined to the end 58 of the bottom surface reinforcing member 45, and the bracket 32 is joined to the end 51 of the bottom surface reinforcing member 41. The bracket 33 is joined only to one end 53 of the ends 52 and 53 of the bottom surface reinforcing member 42, in other words, no joining unit 22 is provided at the end 52.

Figure 4:
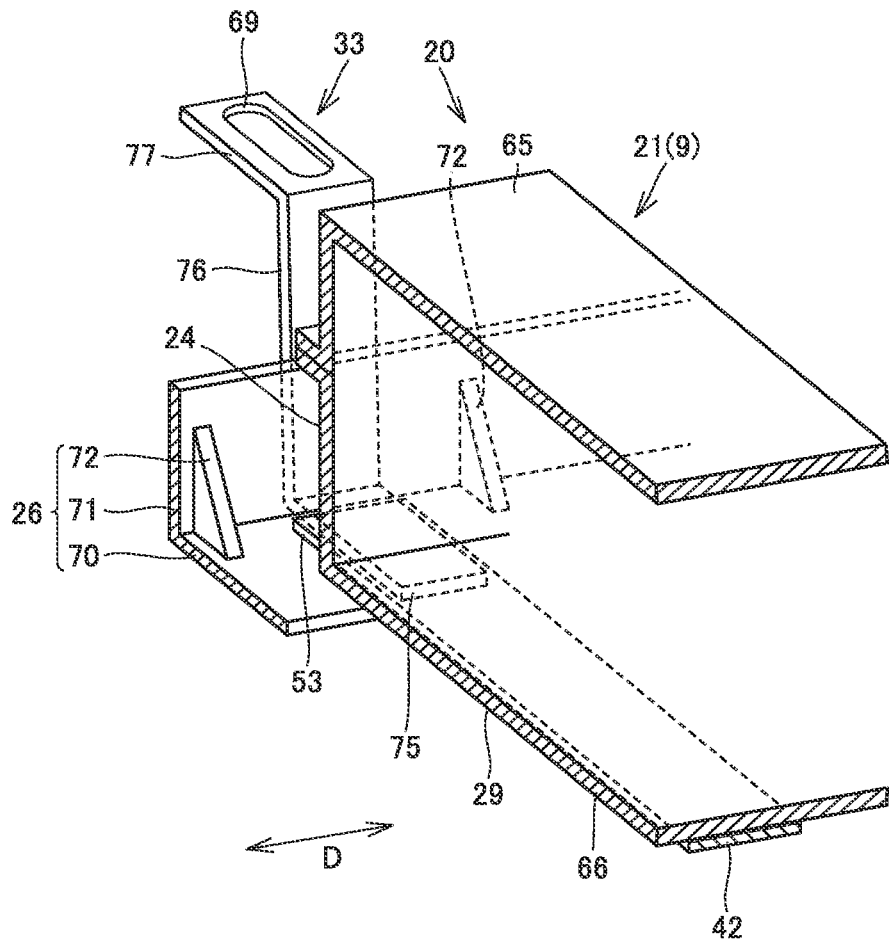
FIG. 4 is a cross-sectional perspective view schematically illustrating the configuration of a bracket 33, a side surface reinforcing member 26, and the surrounding members.

FIG. 4 is a cross-sectional perspective view schematically illustrating the configuration of the bracket 33, the side surface reinforcing member 26, and the surrounding members.

The case body 9 of the power storage case 21 includes an upper case 65 and a lower case 66. The upper case 65 and the lower case 66 may be made of a metal material such as an aluminum alloy, or may be made of resin or the like.

The side surface reinforcing member 26 includes a bottom plate 70, a side wall 71, and a plurality of reinforcing plates 72. The bottom plate 70 and the side wall 71 are formed by bending a plate material into an L-shape. The bottom plate 70 is formed to extend from the side of the bottom surface 29 of the case body 9 to the side of the side surface 24. The side wall 71 is joined to the outer edge of the bottom plate 70 and is formed to extend upward from the outer edge of the bottom plate 70.

The reinforcing plate 72 is formed from a triangular plate material, and the triangular plate material is welded to both the side wall 71 and the bottom plate 70 so as to increase the rigidity of the side surface reinforcing member 26. The plurality of reinforcing plates 72 are arranged with an interval between each other in the front-back direction D. The end 53 of the bottom surface reinforcing member 42 is disposed on the upper surface of the bottom plate 70 between the adjacent reinforcing plates 72.

The bracket 33 includes a bottom plate 75, an uprising portion 76, and an upper end plate 77. The bracket 33 is formed by bending a flat plate material. The bottom plate 75 is formed by bending one end of a plate material into an L shape, and the upper end plate 77 is formed by bending the other end of the plate material into an L shape in the direction opposite to the bottom plate 75. The bracket 33 is arranged so that the width direction thereof is the same as the front-back direction D of the vehicle 1. The bottom plate 75 is disposed on the lower surface of the bottom plate 70, and the bottom plate 75 projects from the lower surface of the bottom plate 70 in the width direction W. The uprising portion 76 is joined to the outer edge of the bottom plate 75 and is formed to extend upward from the outer edge of the bottom plate 75. The upper end plate 77 is joined to the upper edge of the uprising portion 76. The bracket 33 is disposed so as to pass through the lower surface of the end 53 and an outer surface outside the end 53 in the width direction W. The bracket 33 is arranged outside the end 53 in the width direction W.

Figure 5:
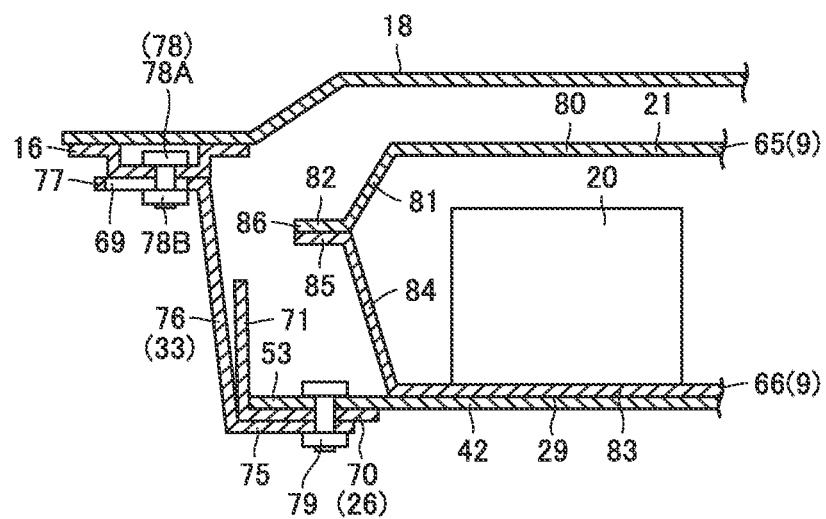
FIG. 5 is a cross-sectional view schematically illustrating the configuration of the bracket 33, the side surface reinforcing member 26, and the surrounding members.

FIG. 5 is a cross-sectional view schematically illustrating the configuration of the bracket 33, the side surface reinforcing member 26, and the surrounding members. The uprising portion 76 is inclined away from the case body 9 in the width direction W as it rises upward from the outer edge of the bottom plate 75. The upper end plate 77 is formed at the upper end of the uprising portion 76, and is fixed to the side member 16 by a fixing member 78. The fixing member 78 includes a bolt 78A and a nut 78B.

Figure 6:
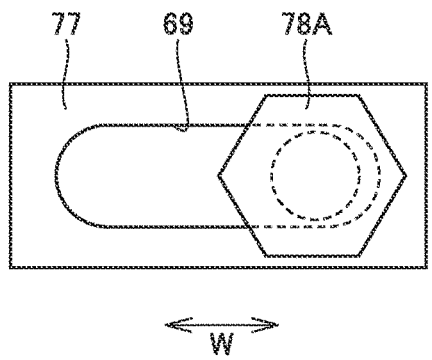
FIG. 6 is a plan view illustrating an upper end plate 77 and a fixing member 78.

FIG. 6 is a plan view illustrating the upper end plate 77 and the fixing member 78. The upper end plate 77 is formed with a through hole 69. The through hole 69 has a longer size in the width direction W.

The shaft of the bolt 78A is inserted in the through hole 69. Specifically, the shaft of the bolt 78A is inserted in the through hole 69 at a position closer to the case body 9.

Thus, when an external force is applied to the bracket 33, the upper end plate 77 is movable relative to the fixing member 78 toward the case body 9.

Returning to FIG. 5, the bottom plate 75 of the bracket 33, the bottom plate 70 of the side surface reinforcing member 26, and the end 53 of the bottom surface reinforcing member 42 are integrally fixed by a fixing member 79.

The upper case 65 includes a top plate 80, a peripheral wall 81, and a flange 82. The top plate 80 forms an upper surface of the upper case 65. The peripheral wall 81 is formed to extend downward from the outer peripheral edge of the top plate 80. The flange 82 is formed to extend from the lower end of the peripheral wall 81 in the horizontal direction, and the flange 82 is formed to have an annular shape.

The lower case 66 includes a bottom plate 83, a peripheral wall 84, and a flange 85. The bottom plate 83 forms a bottom surface of the lower case 66. The peripheral wall 84 is formed to extend upward from the outer peripheral edge of the bottom plate 83. The flange 85 is formed to extend from the upper end of the peripheral wall 84 in the horizontal direction, and the flange 85 is formed to have an annular shape.

The flange 82 and the flange 85 are fixed to each other by a fixing member (not shown), and thereby, the flange 82 and the flange 85 form a projection 86. Note that the projection 86 is formed to extend annularly.

The end 53 of the bottom surface reinforcing member 42 is located outside the tip of the projection 86 in the width direction W. The configuration of the bracket 33 has been described in detail with reference to FIGS. 4 and 5, and the bracket 34 may have the same configuration as the bracket 33.

Figure 7:
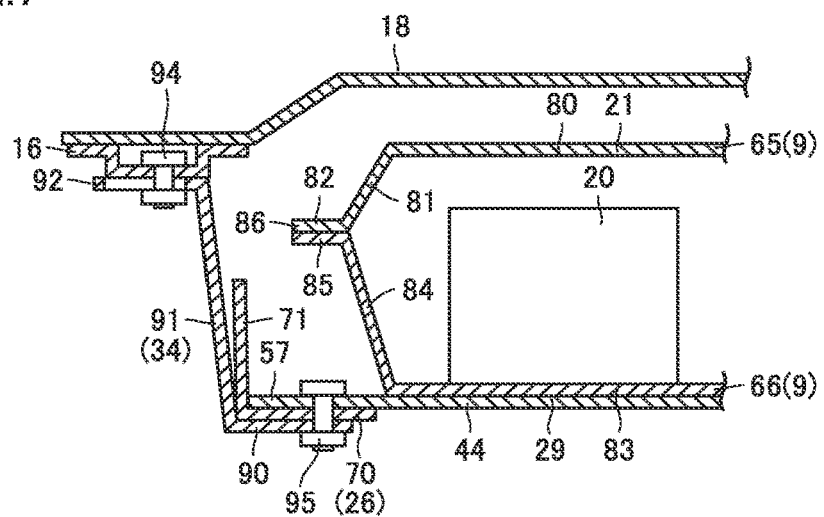
FIG. 7 is a cross-sectional view schematically illustrating the configuration of a bracket 34, a side surface reinforcing member 26, and the surrounding members.

FIG. 7 is a cross-sectional view schematically illustrating the configuration of the bracket 34, the side surface reinforcing member 26, and the surrounding members. The bracket 34 includes a bottom plate 90, an uprising portion 91, and an upper end plate 92. The bottom plate 90 is disposed on the lower surface of the bottom plate 70 of the side surface reinforcing member 26, and is formed to project outside the bottom plate 70 in the horizontal direction. The uprising portion 91 is formed to extend upward from the outer edge of the bottom plate 90, and the uprising portion 91 is inclined away from the case body 9 in the horizontal direction as it rises upward.

The upper end plate 92 is formed at the upper end of the uprising portion 91, and is joined and fixed to the side member 16 by a fixing member 94.

The end 57 of the bottom surface reinforcing member 44 is disposed on the upper surface of the bottom plate 70 of the side surface reinforcing member 26. The tip of the end 57 of the bottom surface reinforcing member 44 is located outside the tip of the projection 86 in the horizontal direction. The bottom plate 90 of the bracket 34, the bottom plate 70 of the side surface reinforcing member 26, and the end 57 of the bottom surface reinforcing member 44 are integrally fixed by a fixing member 95. As illustrated in FIG. 3, the side surface reinforcing member 26 is fixed to the ends 53, 55, 57, 59, 61 and 63.

Figure 8:
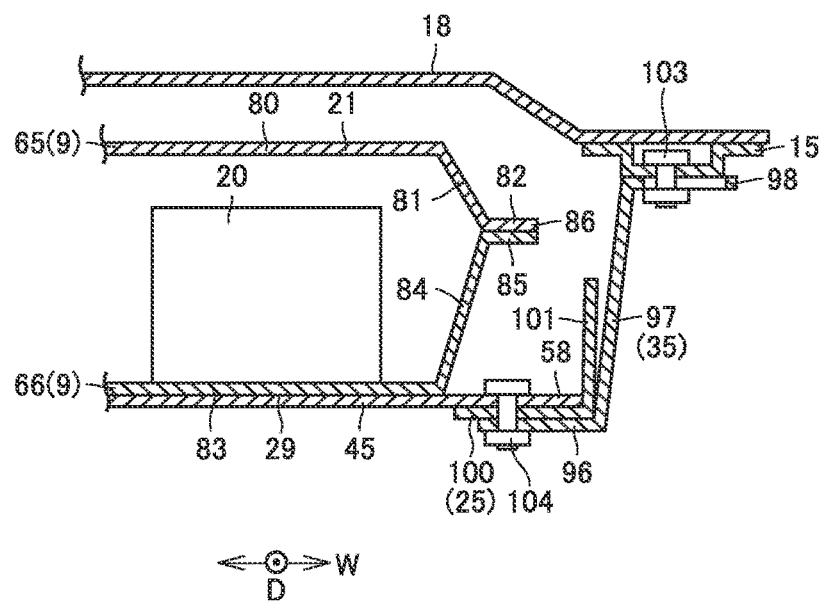
FIG. 8 is a cross-sectional view schematically illustrating the configuration of a bracket 35, a side surface reinforcing member 25, and the surrounding members.

FIG. 8 is a cross-sectional view schematically illustrating the configuration of the bracket 35, the side surface reinforcing member 25, and the surrounding members. The side surface reinforcing member 25 is formed similarly to the side surface reinforcing member 26. The side surface reinforcing member 25 includes a bottom plate 100, a side wall 101, and a plurality of reinforcing plates. The bottom plate 100 and the side wall 101 are formed to have a longer size in the front-back direction D, and the plurality of reinforcing plates are arranged with an interval between each other in the front-back direction D. Note that the reinforcing plates are not illustrated in FIG. 8.

The end 58 of the bottom surface reinforcing member 45 is disposed on the upper surface of the bottom plate 100 between the adjacent reinforcing plates.

The tip of the end 56 of the bottom surface reinforcing member 45 is located outside the tip of the projection 86 in the horizontal direction.

The bracket 35 includes a bottom plate 96, an uprising portion 97, and an upper end plate 98. The bottom plate 96 is disposed on the lower surface of the bottom plate 100 of the side surface reinforcing member 25, and the uprising portion 97 is joined to the outer edge of the bottom plate 96. The uprising portion 97 is inclined away from the case body 9 as it rises upward from the outer edge of the bottom plate 96. The upper end plate 98 is formed at the upper end of the uprising portion 97, and is fixed to the side member 16 by a fixing member 103. The bottom plate 96 of the bracket 35, the bottom plate 100 of the side surface reinforcing member 25, and the end 58 of the bottom surface reinforcing member 45 are integrally fixed by a fixing member 104.

As illustrated in FIG. 3, the side surface reinforcing member 25 is fixed to the ends 52, 54, 56, 58, 60 and 62.

Thus, the ends 52, 54, 56, 58, 60 and 62 of the bottom surface reinforcing members 42, 43, 44, 45, 46 and 47 on the side of the side surface 23 are joined by the side surface reinforcing member 25, and the ends 53, 55, 57, 59, 61 and 63 on the side of the side surface 24 are joined by the side surface reinforcing member 26. The bottom surface reinforcing members 42, 43, 44, 45, 46 and 47 are fixed to the bottom surface 29 of the case body 9.

In the vehicle 1 having the configuration as mentioned above, an obstacle such as another vehicle may come into collision with the vehicle 1 from a side surface thereof, which thereby applies an impact force to the power storage device 4.

Figure 9:
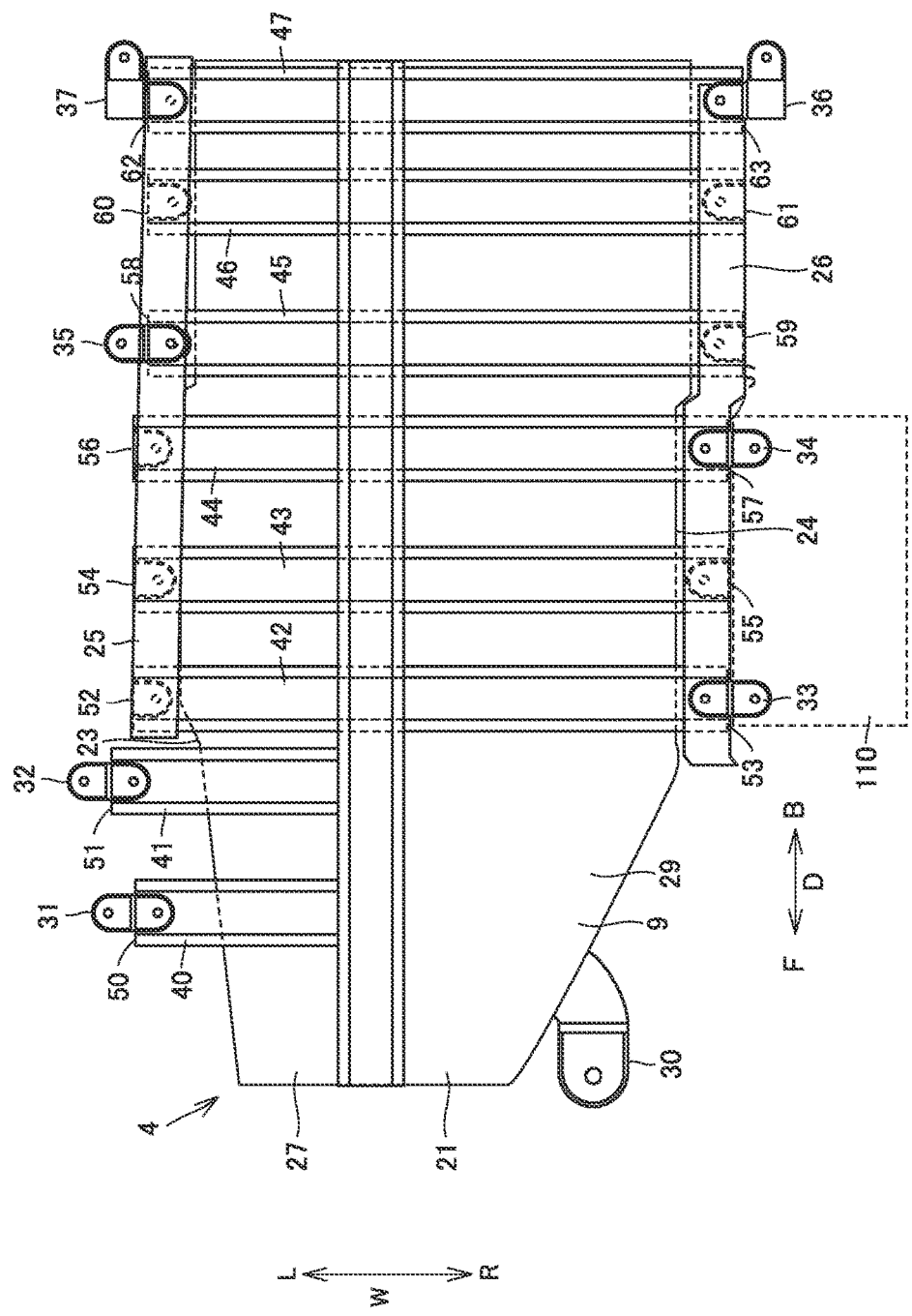
FIG. 9 is a bottom view illustrating the bottom surface of the power storage device 4 when an impact force is applied thereto.

FIG. 9 is a bottom view illustrating the bottom surface of the power storage device 4 when an impact force is applied thereto. FIG. 9 illustrates an example where a collision object 110 comes into collision with the side surface 24 of the power storage module 20. The collision object 110 has collided with the brackets 33 and 34.

Figure 10:
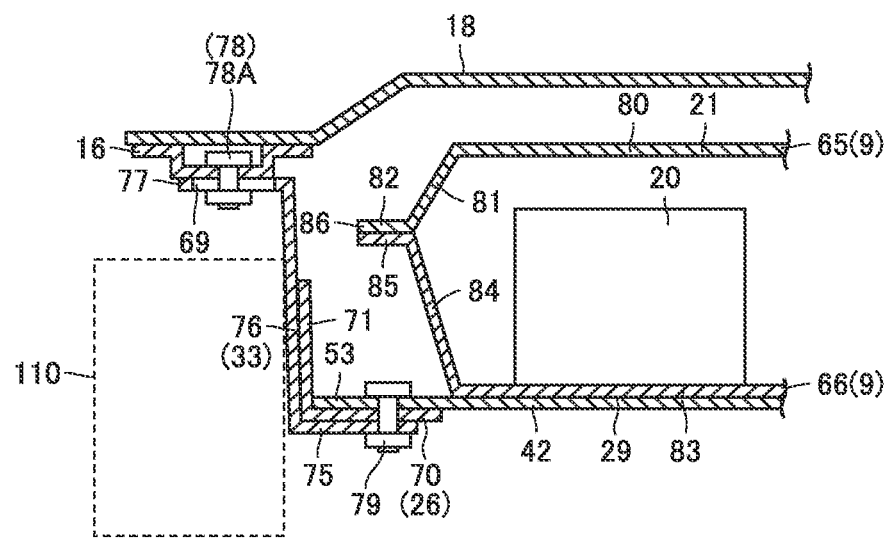
FIG. 10 is a cross-sectional view illustrating the configuration of the bracket 33 and its surrounding members after the collision with a collision object 110.

FIG. 10 is a cross-sectional view illustrating the configuration of the bracket 33 and its surrounding members after the collision with the collision object 110.

As illustrated in FIG. 10, after the collision object 110 comes into collision with the uprising portion 76 of the bracket 33, the upper end plate 77 is moved toward the case body 9.

Figure 11:
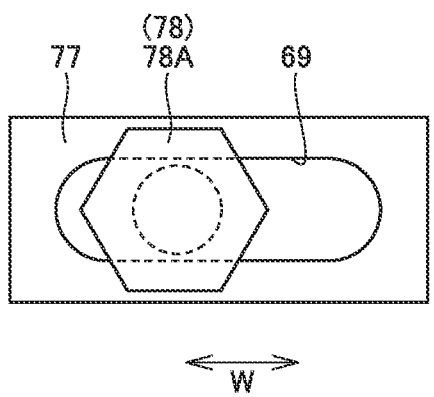
FIG. 11 is a plan view illustrating the configuration of the upper end plate 77 and its surrounding members after the upper end plate 77 has been moved toward the power storage case 21.

FIG. 11 is a plan view illustrating the configuration of the upper end plate 77 and its surrounding members after the upper end plate 77 has been moved toward the case body 9. As illustrated in FIG. 11, the through hole 69 into which the bolt 78A is inserted is formed to have a longer size in the width direction W, which allows the upper end plate 77 to be moved toward the case body 9. As the upper end plate 77 is moved toward the case body 9, the bolt 78A moves in the through hole 69 accordingly.

Returning to FIG. 10, as the upper end plate 77 is moved toward the case body 9 by the external force from the collision object 110, the uprising portion 76 is deformed by the external force applied from the collision object 110 by swinging around a portion joined to the bottom plate 75. Thus, the bracket 33 is deformed, and the collision object 110 moves toward the case body 9.

The tip of the end 53 of the bottom surface reinforcing member 42 is located outside the tip of the projection 86 in the width direction W. Therefore, after the collision object 110 deforms the bracket 33, the collision object 110 bumps against the end 53 of the bottom surface reinforcing member 42 with the uprising portion 76 and the side wall 71 interposed therebetween before it comes into collision with the case body 9. Thus, an impact force is applied to the end 53 from the collision object 110 in the width direction W.

Since the bottom surface reinforcing member 42 is fixed to the bottom surface 29 of the case body 9, the impact force applied to the bottom surface reinforcing member 42 is transmitted to the case body 9.

In the first embodiment, since the bottom surface reinforcing member 42 is formed to have a longer size in the width direction W, when an impact force is applied to the bottom surface reinforcing member 42 in the width direction W, in other words, when a load is applied to the bottom surface reinforcing member 42 in the axial direction, the bottom surface reinforcing member 42 is hardly deformed. Meanwhile, when the collision object 110 bumps against the bracket 33 in the width direction W, an external force is applied to the bracket 33 in the width direction W, the uprising portion 76 may easily swing around a portion joined to the bottom plate 75. Thus, when a load is applied in the width direction W, the bracket 33 is easier to be deformed than the bottom surface reinforcing member 42.

In addition, since the bracket 33 is made of a metal material having a tensile strength of about 440 MPa, and the bottom surface reinforcing member 42 is made of a metal material having a tensile strength of about 1180 MPa, the bracket 33 is easier to be deformed than the bottom surface reinforcing member 42.

As mentioned above, since the bracket 33 is easier to be deformed by a load in the width direction W than the bottom surface reinforcing member 42, the bracket 33 deforms when bumped by the collision object 110, which relatively reduces the impact force to be transmitted to the case body 9 through the bracket 33 and the bottom surface reinforcing member 42.

Since the bracket 33 deforms when bumped by the collision object 110, the inertial force to be applied to the power storage module 20 housed in the case body 9 is reduced, which makes it possible to prevent the power storage module 20 from moving in the case body 9. Thereby, the power storage module 20 is prevented from interfering with the inner wall surface of the case body 9, which makes it possible to prevent the power storage module 20 from being damaged.

Further, before the collision object 110 bumps against the end 53 with the side wall 71 and the uprising portion 76 interposed therebetween, a part of the kinetic energy of the collision object 110 is consumed in deforming the bracket 33, which reduces the impact force to be applied by the collision object 110 to the end 53.

Since the impact force applied to the end 53 is reduced, the impact force transmitted to the case body 9 through the bottom surface reinforcing member 42 is also reduced. Accordingly, even when the collision object 110 applies an impact force to the end 53, the inertial force to be applied to the power storage module 20 may be reduced, which makes it possible to prevent the power storage module 20 from interfering with the inner wall or the like of the case body 9.

In FIG. 9, it is described that the bracket 33 or the like is deformed by the impact force applied from the collision object 110, the bracket 34 may be deformed in the same manner as the bracket 33, and an impact force may also be applied to the end 57 of the bottom surface reinforcing member 44. However, before the impact force is transmitted from the collision object 110 to the case body 9, a part of the kinetic energy of the collision object 110 is consumed in deforming the bracket 34, and thus, the impact force to be applied to the case body 9 is reduced.

Since the bottom surface reinforcing members 42 and 44, to which the impact force is applied, are fixed to the bottom surface of the case body 9, as the bottom surface reinforcing members 42 and 44 are displaced by the impact force, the case body 9 is deformed accordingly. Thus, the side surface 24 of the case body 9 deforms by recessing inward toward the side surface 23, and the side surface 23 deforms by bulging outward. In particular, a portion of the side surface 23 located between the bottom surface reinforcing member 42 and the bottom surface reinforcing member 44 deforms largely outward.

Figure 12:
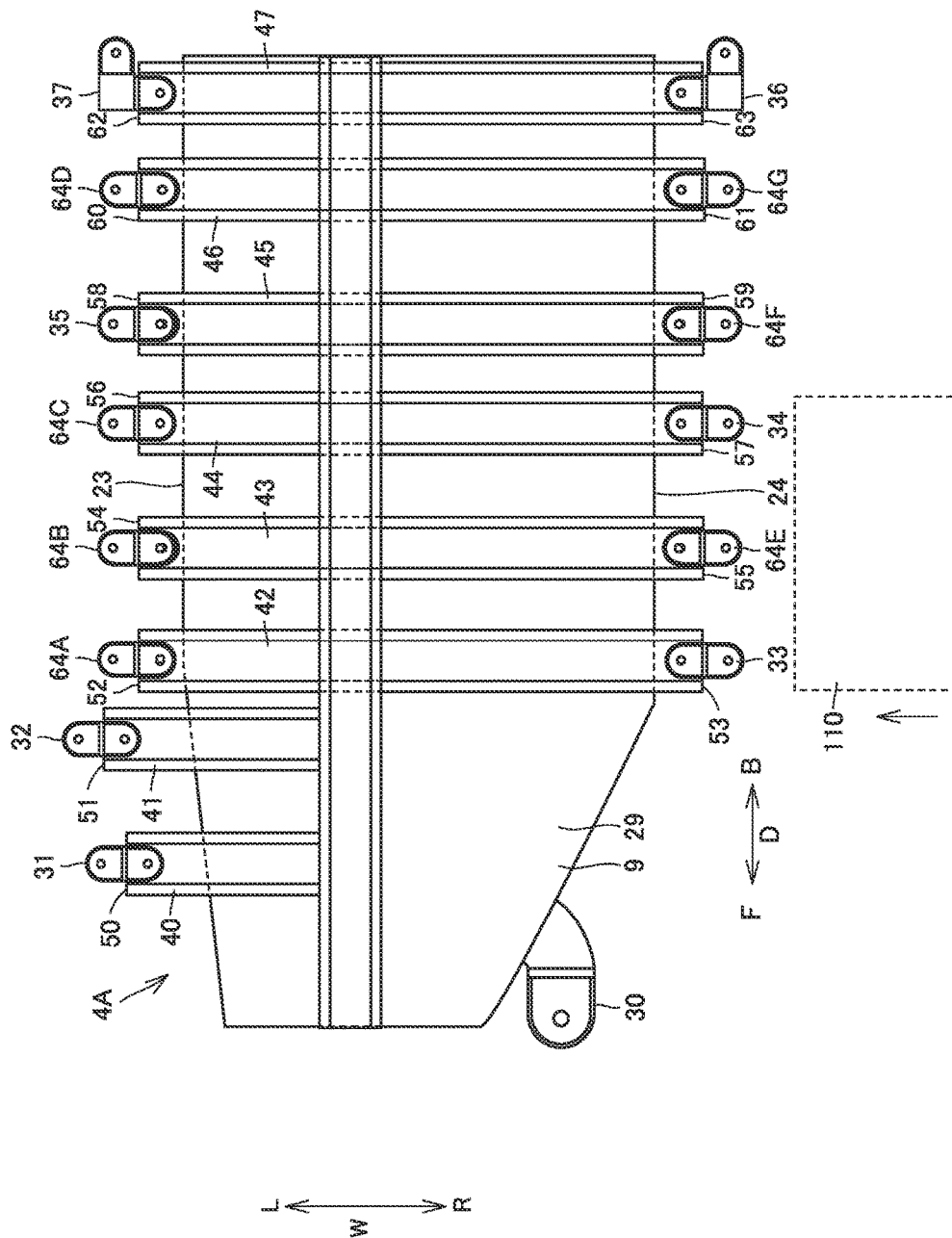
FIG. 12 is a bottom view illustrating a bottom surface of a power storage device 4A according to a comparative example.

FIG. 12 is a bottom view illustrating a bottom surface of a power storage device 4A according to a comparative example. The power storage device 4A includes the entire configuration of the power storage device 4 except the side surface reinforcing members 25 and 26, and brackets 64A, 64B, 64C, 64D, 64E, 64F and 64G. The brackets 64A, 64B, 64C, 64D, 64E, 64F and 64G are joined to ends 52, 54, 56, 60, 55, 59 and 61, respectively.

Therefore, in the power storage device 4A, the brackets 64A, 64B, 64C, 35, 64D and 37 are joined to the ends 52, 54, 56, 58, 60 and 62 of the bottom surface reinforcing members 42, 43, 44, 45, 46 and 47, respectively, and the brackets 33, 64E, 34, 64F, 64G and 36 are joined to the ends 53, 55, 57, 59, 61 and 63, respectively.

Assume that a collision object 110 comes into collision with the power storage device 4A having the configuration as mentioned above from the side surface 24. In this case, the collision object 110 firstly bumps against the brackets 33, 64E and 34, and thus, the collision object 110 applies an impact force to the ends 53, 55 and 57 of the bottom surface reinforcing members 42, 43 and 44, respectively.

Accordingly, a portion of the side surface 23 located between the bottom surface reinforcing member 42 and the bottom surface reinforcing member 44 attempts to deform by bulging outward.

In the power storage device 4A according to the present comparative example, even though the side surface 23 attempts to deform by bulging outward as mentioned above, since the brackets 64A, 64B and 64C are joined to the ends 52, 54 and 56, the deformation of the side surface 23 is blocked.

Figure 13:
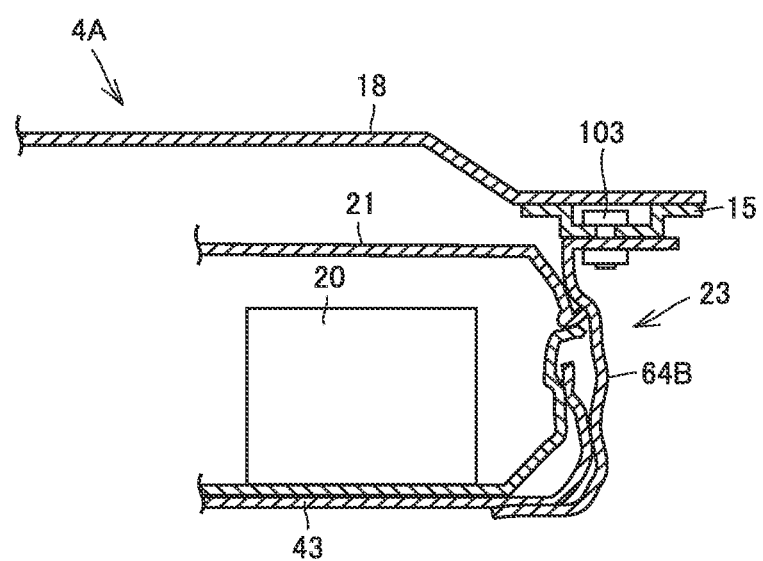
FIG. 13 is a cross-sectional view illustrating the configuration of a bracket 64B and its surrounding members after the collision with a collision object 110.

FIG. 13 is a cross-sectional view illustrating the configuration of the bracket 64B and its surrounding members after the collision with the collision object 110. Since the power storage device 4A is provided with the bracket 64B, when the side surface 23 of the case body 9 attempts to deform by bulging outward, the bottom surface reinforcing member 43 and the case body 9 interfere with the bracket 64B, which deforms the bottom surface reinforcing member 43 and the case body 9.

Therefore, when the collision object 110 bumps against the side surface 24, the side surface 23 is prevented from deforming by bulging outward.

In FIG. 13, the configuration of the bracket 64B and its surrounding members has been described. The same applies to the brackets 64A and 64C. Thus, the brackets 64A and 64C prevent the side surface 23 of the case body 9 from deforming by bulging outward.

Thus, when the collision object 110 bumps against the side surface 24, the side surface 24 deforms by recessing inward, while it is difficult for the side surface 23 to deform by bulging outward, which reduces the internal volume of the case body 9. As a result, the power storage module 20 housed in the case body 9 may interfere with the inner wall of the case body 9, which may damage the power storage module 20.

On the contrary, as illustrated in FIG. 9, in the power storage device 4 according to the first embodiment, when the collision object 110 bumps against the side surface 24, since the side surface 23 is allowed to deform, it is possible to prevent the power storage module 20 housed in the case body 9 from being damaged.

Since the brackets 31, 32, 35 and 37 are provided on the side of the side surface 23, a part of the impact force applied to the case body 9 from the collision object 110 is transmitted to the side member 15 and the cross member 17 through the intermediary of the bottom surface reinforcing members 40, 41, 45 and 47 and the brackets 31, 32, 35 and 37. Therefore, the case body 9 is prevented from being largely deformed by the impact force from the collision object 110, which prevents the power storage module 20 housed in the case body 9 from being damaged.

In addition, the ends 52 and 56 on the opposite side to the ends 53 and 57 where the brackets 33 and 34 are provided are located between the brackets 32 and 35.

When an impact force from the collision object 110 causes a portion of the side surface 23 located between or around the end 52 and the end 56 to deform by bulging outward, a part of the impact force applied to the case body 9 is transmitted to the side member 15 through the brackets 32 and 35. As a result, it is possible to prevent a portion of the side surface 23 located between or around the end 52 and the end 56 from deforming greatly, which reduces the damage to the side surface 23.

In the power storage device 4 according to the first embodiment, the bottom surface reinforcing members 42, 43, 44, 45, 46 and 47 are joined to each other by the side surface reinforcing members 25 and 26. Thus, as illustrated in FIG. 9, even if an impact force is applied from the collision object 110 to the bottom surface reinforcing members 42, 43 and 44 in the width direction W so as to displace the same, the side surface reinforcing members 26 and 25 inhibits the displacement of the bottom surface reinforcing members 42, 43 and 44.

Therefore, even when an impact force is applied from the collision object 110 to the bottom surface reinforcing members 42, 43 and 44, the displacement amount of each of the bottom surface reinforcing members 42, 43 and 44 is small, which reduces the deformation amount of the case body 9.

Thereby, the side surface 24 of the case body 9 is prevented from deforming by recessing greatly inward, and accordingly, the side surface 23 is prevented from deforming by bulging greatly outward. As a result, the deformation of the case body 9 is reduced, which makes it possible to prevent the power storage module 20 housed in the case body 9 from interfering with the inner wall surface of the case body 9. In the first embodiment, both the side surface reinforcing member 25 and the side surface reinforcing member 26 are provided, it is acceptable that only the side surface reinforcing member 25 or the side surface reinforcing member 26 is provided.

In FIG. 3, the bracket (fourth bracket) 30 is provided closer to the front end of the power storage device 4 than the brackets (first bracket) 33 and 34. Similar to the brackets 33, 34 and the like, the bracket 30 is formed by bending a plate material. The bracket 30 is arranged so that the width direction of the bracket 30 is parallel to the width direction W of the vehicle 1. The brackets 33, 34 and the like are arranged so that the width direction of the brackets 33, 34 and the like is parallel to the front-back direction D of the vehicle 1. The width W1 of the bracket 30 is larger than the width W2 of the bracket 33 and the width W3 of the bracket 34.

Thus, the rigidity of the bracket 30 when an external force is applied from the front-back direction D is greater than the rigidity of the brackets 33 and 34 when an external force is applied from the width direction W, and thereby, the rigidity of the front end of the power storage case 21 is increased. It is considered that an obstacle on the ground, for example, may bump against the power storage device 4 when the vehicle 1 is traveling. Since the rigidity of the front end of the power storage case 21 is increased by the bracket 30, the front end of the power storage case 21 may be prevented from being damaged greatly.

The bottom surface reinforcing members 42, 43 and 44 are formed to extend in the width direction W. Thus, when an impact force is applied by the collision object 110 to the ends 53, 55 and 57 of the bottom surface reinforcing members 42, 43 and 44 from the width direction W, the bottom surface reinforcing members 42, 43 and 44 are unlikely to be deformed. Therefore, the collision object 110 may be prevented from reaching the side surface 24, which prevents the side surface 23 of the power storage case 21 from being damaged.

FIG. 9 illustrates an example in which the collision object 110 comes into collision with the power storage device 4 by bumping against the bracket 33 and the bracket 34. The collision object 110 may come into collision with the power storage device 4 in a different manner.

Figure 14:
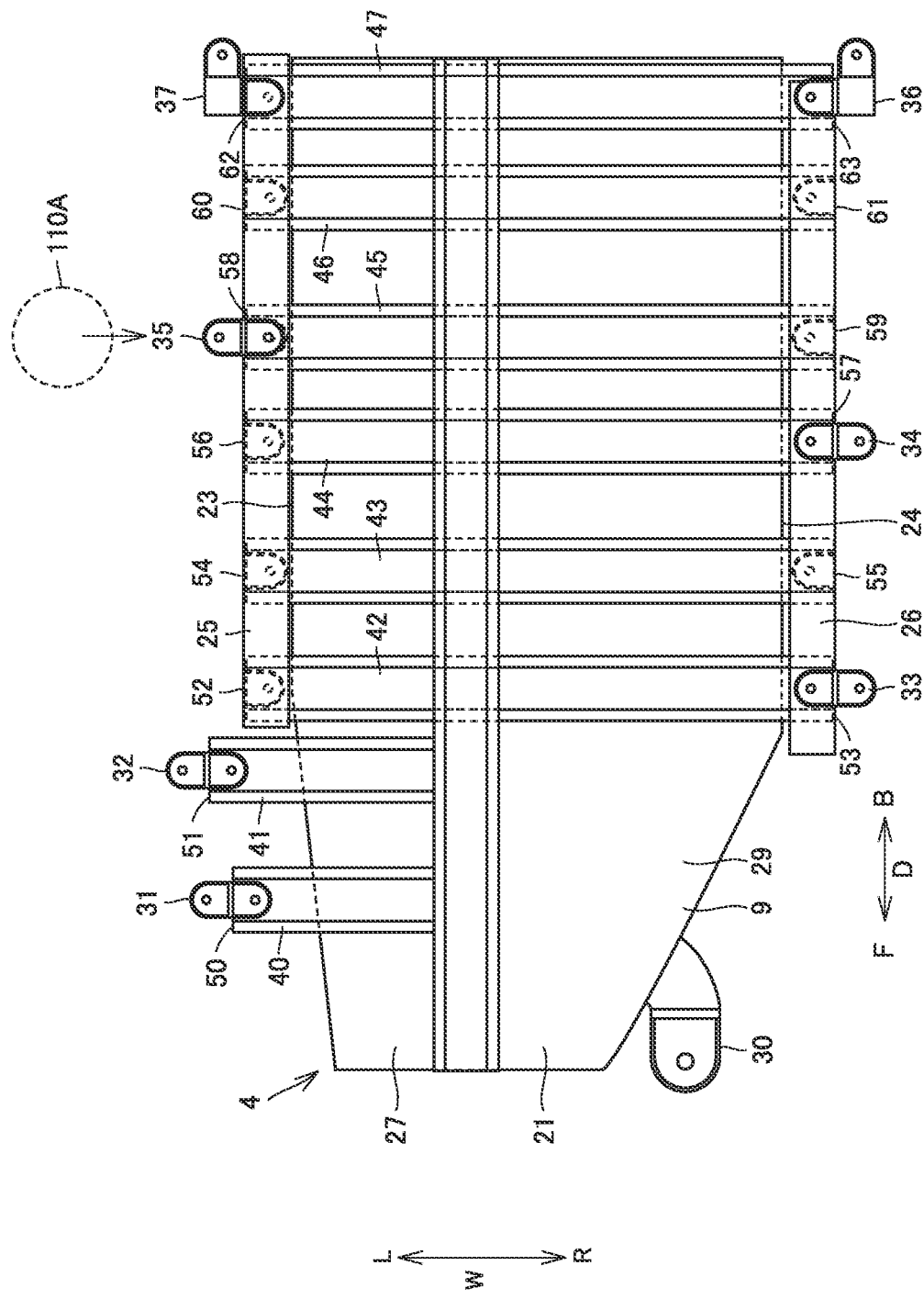
FIG. 14 is another bottom view illustrating the collision with a collision object 110A.

FIG. 14 is another bottom view illustrating the collision with a collision object 110A. In the example illustrated in FIG. 14, the collision object 110A comes into collision with the power storage device 4 by bumping against the bracket 35.

At the time of collision, the collision object 110A causes the bracket 35 to deform. Thus, an impact force is applied to the bottom surface reinforcing member 45 joined to the bracket 35. Accordingly, the bottom surface reinforcing member 45 is deformed in the width direction W together with the case body 9 fixed to the bottom surface reinforcing member 45. Specifically, a portion of the side surface 23 located around the bracket 35 and the end 58 deforms by recessing inward. Accordingly, a portion of the side surface 24 around a position facing the bracket 35 deforms by bulging outward.

In the present example, the bracket 35 is located between the bracket 34 and the bracket 36 in the front-back direction D. The bracket 35 is joined to only one of the ends 58 and 59 of the bottom surface reinforcing member 45, and the end 59 is not provided with any bracket. Thus, no bracket is provided at a portion of the side surface 24 facing the bracket 35, which allows the side surface 24 to deform by bulging outward.

Therefore, the internal volume of the case body 9 is prevented from becoming smaller, and thereby the power storage module 20 is prevented from interfering with the inner wall of the case body 9, which prevents the power storage module 20 from being damaged.

In the power storage device 4 according to the first embodiment, the number of the brackets 31, 32, 35 and 37 provided on the side of the side surface 23 of the power storage device 4 is the same as the number of the brackets 30, 33, 34 and 36 provided on the side of the side surface 24, and as a result, the deformation amount of the case body 9 when the collision object 110 bumps against the side surface 24 is substantially equal to the deformation amount of the case body 9 when the collision object 110 bumps against the side surface 23.

In the first embodiment, the description has been carried out by assuming that the power storage device 4 is arranged on the lower surface of the bottom member 6. However, the power storage device 4 may be mounted at the other positions.

In the first embodiment, the description has been carried out by adopting the width direction of the vehicle as the "first direction" and the front-back direction of the vehicle as the "second direction", it is acceptable that the front-back direction of the vehicle is adopted as the "first direction", and the width direction of the vehicle is adopted as the "second direction".

Second Embodiment

Figure 15:
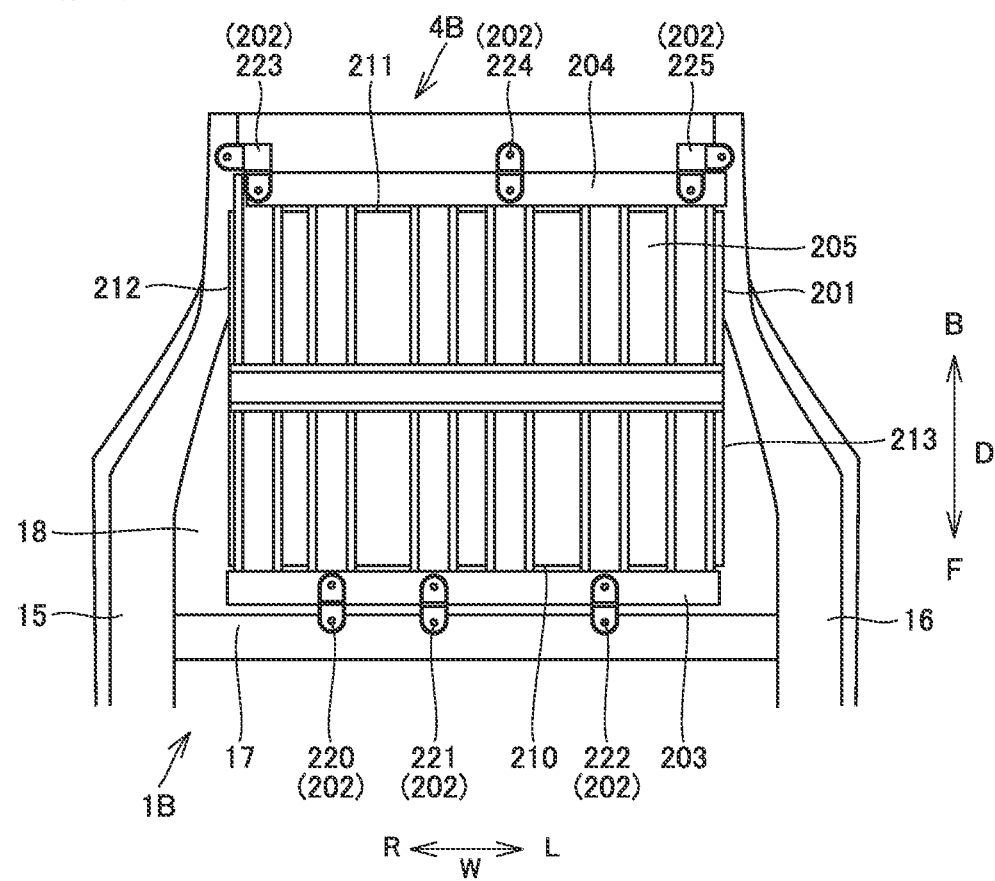
FIG. 15 is a bottom view illustrating a bottom surface of a vehicle 1B.
Figure 16:
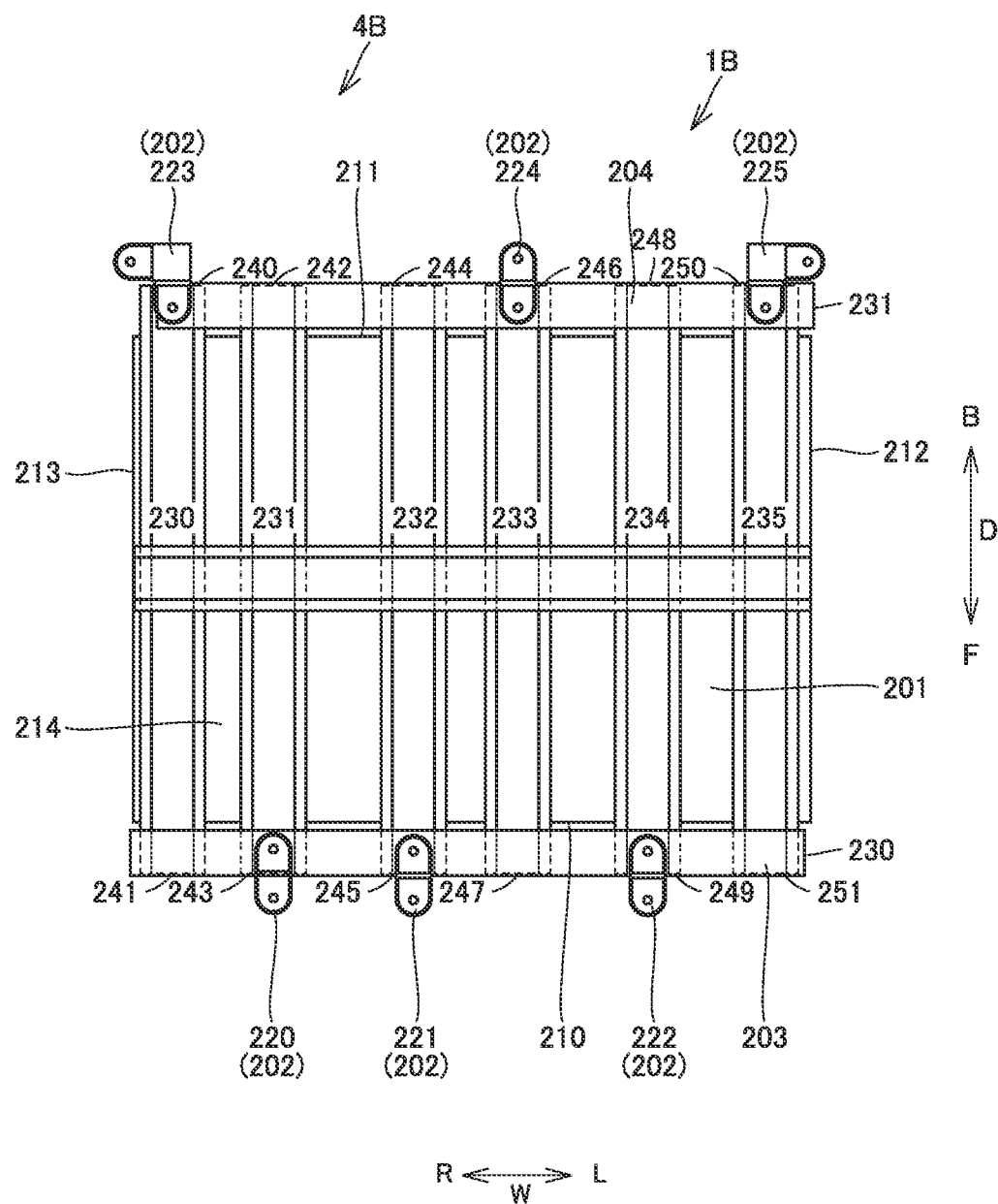
FIG. 16 is a bottom view illustrating a power storage case 201.

A vehicle 1B according to a second embodiment will be described with reference to FIG. 15. FIG. 15 is a bottom view illustrating a bottom surface of a vehicle 1B, and FIG. 16 is a bottom view illustrating a power storage case 201. The vehicle 1B includes a bottom member 6, a power storage device 4B, a joining unit 202, and side surface reinforcing members 203 and 204. The power storage device 4B is provided at a position at the rear end of the bottom member 6. Specifically, the power storage device 4B is provided on the lower surface of the bottom member 6.

The power storage device 4B includes a power storage case 201 and a power storage module (not shown). The power storage module is housed in the power storage case 201.

The power storage case 201 includes a case body 205 and a plurality of bottom surface reinforcing members 230, 231, 232, 233 and 234. The case body 205 includes a front surface 210, a rear surface 211, a side surface 212, a side surface 213, and a lower surface 214. The front surface 210 is located at the front side in the front-back direction D, and the rear surface 211 is located at the opposite side facing the front surface 210. The side surface 213 is located at one side in the width direction W, and the side surface 212 is located at the other side in the width direction W.

The joining unit 202 includes brackets 220, 221, 222, 223, 224 and 225. The brackets 220, 221 and 222 are provided on the side of the front surface 210. The brackets 223, 224 and 225 are provided on the side of the rear surface 211.

The brackets 220, 221 and 222 join and fix the power storage case 201 to the cross member 17. The bracket 223 joins and fixes the power storage case 201 to the side member 15, and the bracket 225 joins and fixes the power storage case 201 to the side member 16. The bracket 224 joins and fixes the power storage case 201 to the floor panel 18.

The side surface reinforcing member 203 is disposed on the side of the front surface 210, and the side surface reinforcing member 203 is formed to extend along the front surface 210. The side surface reinforcing member 204 is disposed on the side of the rear surface 211, and the side surface reinforcing member 204 is formed to extend along the rear surface 211.

The brackets 220 and 221 are disposed between the bracket 223 and the bracket 224 in the width direction W. Similarly, the bracket 222 is disposed between the bracket 224 and the bracket 225 in the width direction W.

The bracket 224 is disposed between the bracket 221 and the bracket 222 in the width direction W.

Each of the bottom surface reinforcing member 230, 231, 232, 233, 234 and 235 is formed to have a longer size in the front-back direction D. The bottom surface reinforcing members 230, 231, 232, 233, 234 and 235 are arranged with an interval between each other in the width direction W. Each of the bottom surface reinforcing member 230, 231, 232, 233, 234 and 235 is fixed to the power storage case 201 by bolts (not shown) or the like.

The bottom surface reinforcing member 230 includes an end 240 located on the side of the rear surface 211 and an end 241 located on the side of the front surface 210. Similarly, the bottom surface reinforcing member 231 includes an end 242 located on the side of the rear surface 211 and an end 243 located on the side of the front surface 210, the bottom surface reinforcing member 232 includes an end 244 located on the side of the rear surface 211 and an end 245 located on the side of the front surface 210, the bottom surface reinforcing member 233 includes an end 246 located on the side of the rear surface 211 and an end 247 located on the side of the front surface 210, the bottom surface reinforcing member 234 includes an end 248 located on the side of the rear surface 211 and an end 249 located on the side of the front surface 210, and the bottom surface reinforcing member 235 includes an end 250 located on the side of the rear surface 211 and an end 251 located on the side of the front surface 210. Specifically, the ends 241, 243, 245, 247, 249 and 251 are located behind the rear surface 211, and the ends 240, 242, 244, 246, 248 and 250 are located in front of the front surface 210.

The bracket 220 joins the end 243 to the bottom surface reinforcing member 230, the bracket 221 joins the end 245 to the bottom surface reinforcing member 230, and the bracket 222 joins the end 249 to the bottom surface reinforcing member 230. Similarly, the brackets 223, 224 and 225 join the ends 244, 248 and 252, respectively, to the bottom surface reinforcing member 231.

Figure 17:
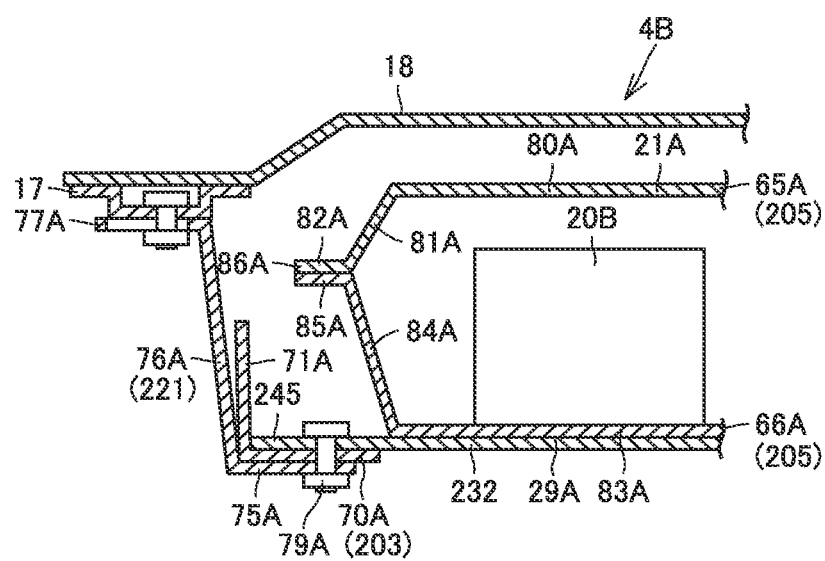
FIG. 17 is a cross-sectional view illustrating the configuration of a bracket 221 and its surrounding members.

FIG. 17 is a cross-sectional view illustrating the configuration of the bracket 221 and its surrounding members. The case body 205 of the power storage device 4B includes an upper case 65A and a lower case 66A. The upper case 65A includes a top plate 80A, a peripheral wall 81A, and a flange 82A. The lower case 66A includes a bottom plate 83A, a peripheral wall 84A, and a flange 85A. The flange 82A and the flange 85A form a projection 86A.

The side surface reinforcing member 203 includes a bottom plate 70A and a side wall 71A. The end 245 is disposed on the upper surface of the bottom plate 70A.

The bracket 221 includes a bottom plate 75A, an uprising portion 76A, and an upper end plate 77A. The bottom plate 75A is disposed on the lower surface of the bottom plate 70A. The uprising portion 76A is formed to rise upward from the outer edge of the bottom plate 75A. The upper end plate 77A is formed at the upper end of the uprising portion 76A.

The bottom plate 75A of the bracket 221, the bottom plate 70A of the side surface reinforcing member 203, and the end 245 of the bottom surface reinforcing member 232 are fixed to each other by a fixing member 79A.

The configuration of the bracket 221 has been described in the above, the other brackets 220, 222, 223, 224 and 225 are configured similarly to the bracket 221. Further, the side surface reinforcing member 204 is configured similarly to the side surface reinforcing member 203.

Another vehicle may come into collision with the vehicle 1B having the configuration as mentioned above from the rear side of the vehicle 1B.

As illustrated in FIG. 16, for example, a collision object may bump against the bracket 221. In the second embodiment, even if a collision object 110 bumps against the bracket 221 and the end 245 and thereby applies an impact force to the power storage device 4B, since no bracket is provided on the side opposite to the bracket 221 in the front-back direction D, the power storage module 20B in the power storage device 4B may be prevented from being damaged when bumped by the collision object. Since the bracket 221 is formed with the uprising portion 76A, the same effect as the bracket 33 of the power storage device 4 may be obtained.

Although the embodiments of the present disclosure have been described as above, it should be understood that the embodiments disclosed herein are illustrative and non-restrictive in every respect. The scope of the present disclosure is defined by the terms of the claims, and is intended to include any modifications within the meaning and scope equivalent to the terms of the claims.

What is claimed is:

1. A vehicle comprising:
   a vehicle body;
   a power storage device provided at a lower portion of the vehicle body; and
   a joining unit that joins the power storage device to the vehicle body,
   the power storage device including:
     a power storage module; and
     a power storage case,
   the power storage case being provided with a first side surface located at one side in a first direction which is one of a width direction or a front-back direction of the vehicle and a second side surface located at the other side facing the first side surface, and the power storage module being housed in the power storage case,
   the power storage case including:
     a case body that houses the power storage module; and
     a plurality of bottom surface reinforcing members provided on a bottom surface of the case body,
   each of the plurality of bottom surface reinforcing members having a first end located on the side of the first side surface and a second end located on the side of the second side surface,
   the plurality of bottom surface reinforcing members including:
     a first bottom surface reinforcing member;
     a second bottom surface reinforcing member arranged with an interval from the first bottom surface reinforcing member in a second direction which is the other one of the width direction or the front-back direction of the vehicle; and
     a third bottom surface reinforcing member arranged at the other side of the first bottom surface reinforcing member relative to the second bottom surface reinforcing member,
   the joining unit including:
     a first bracket joined to a first end of the first bottom surface reinforcing member;
     a second bracket joined to a second end of the second bottom surface reinforcing member; and
     a third bracket joined to a second end of the third bottom surface reinforcing member,
   no joining unit being provided at a second end of the first bottom surface reinforcing member.

2. The vehicle according to claim 1, wherein
the first end of the first bottom surface reinforcing member is formed to protrude in the first direction further than the first side surface.

3. The vehicle according to claim 2, wherein
the first bracket is disposed outside the first end in the first direction.

4. The vehicle according to claim 1, wherein
the first bottom surface reinforcing member is formed to extend in the first direction.

5. The vehicle according to claim 1, wherein
the rigidity of a material forming the first bracket is lower than the rigidity of a material forming the first bottom surface reinforcing member.

6. The vehicle according to claim 1, wherein
the first bracket includes an uprising portion formed to extend upward from a portion joined to the power storage case.

7. The vehicle according to claim 1, wherein
the power storage device further includes a side surface reinforcing member provided on at least one of the first side surface and the second side surface, and
the side surface reinforcing member is joined to the first bottom surface reinforcing member and the second bottom surface reinforcing member.

8. The vehicle according to claim 1, wherein
the first direction is the width direction of the vehicle,
the joining unit includes a fourth bracket disposed in a front portion of the vehicle on the side of the first side surface and arranged in front of the first bracket, and
the width of the fourth bracket in the width direction of the vehicle is wider than the width of the first bracket in the front-back direction of the vehicle.

* * * * *